Dec. 19, 1967  P. E. MASSIE  3,359,437
MAGNETIC RATCHET MOTOR
Filed May 23, 1963  2 Sheets-Sheet 1

PHILIP E. MASSIE
INVENTOR.

BY
Albert M. Herzig
ATTORNEY

Dec. 19, 1967   P. E. MASSIE   3,359,437
MAGNETIC RATCHET MOTOR
Filed May 23, 1963   2 Sheets-Sheet 2

PHILIP E. MASSIE
INVENTOR.

BY
Albert M. Herzig
ATTORNEY 3,359,437
MAGNETIC RATCHET MOTOR
Philip E. Massie, 4220 Irving Place,
Culver City, Calif. 90230
Filed May 23, 1963, Ser. No. 282,617
15 Claims. (Cl. 310—21)

This invention relates to a reversible electric motor or actuator of simple configuration, operating by means of ratchets driven by variation of alternating magnetic flux in three air gaps. The motor is applicable to either rotary or linear actuation by suitable design of the auxiliary mechanical components. The motor is designed to operate from alternating voltage such as common 60 cycle, 118 volt electrical power normally distributed in commercial, industrial and residential areas. The motor is adapted to design for any reasonable voltage and frequency of the alternating type. The design of the motor takes advantage of the concepts and techniques used in the design of transformers for alternating voltage operation, as described more in detail hereinafter.

The motor or actuator of the invention is an unique form of electromagnetic mechanical device for converting electrical power into mechanical movement, in either of two directions, under control of a switch operable in either of two directions. Limit switches are provided so that the actuator will not exceed the travel of the driven device. The actuator is particularly unique in that it lends itself to very economical manufacture in relation to existing devices, and that it is applicable to a wide variety of devices for rotational or translational movement. Further, the control electrical circuitry can be made of sufficiently low potential as to be completely safe in nearly any environment. The device adapts itself as a consumer item, but additionally, it is adapted for industrial applications.

One primary adaptation of the actuator system is to provide a package unit adapted to fit over conventional manual rotary controls such as variable auto transformers, rheostats and potentiometers. This will provide remote control of these control devices economically and will adapt to existing commercial units. Different forms can be provided for different shaft sizes. The invention has additional adaptations and applications for home uses such as in the control of room light level for a home movie projector, etc.

The foregoing states in general terms the nature of the invention, the primary objects being to achieve and realize the purposes and characteristics set forth in the foregoing in a simplified and economical but very effective and positive way. The unit of the invention is economical and efficient from the standpoint of power consumption.

Further objects and additional advantages of the invention will become apparent from the following detailed description and annexed drawings wherein.

Figure 1:
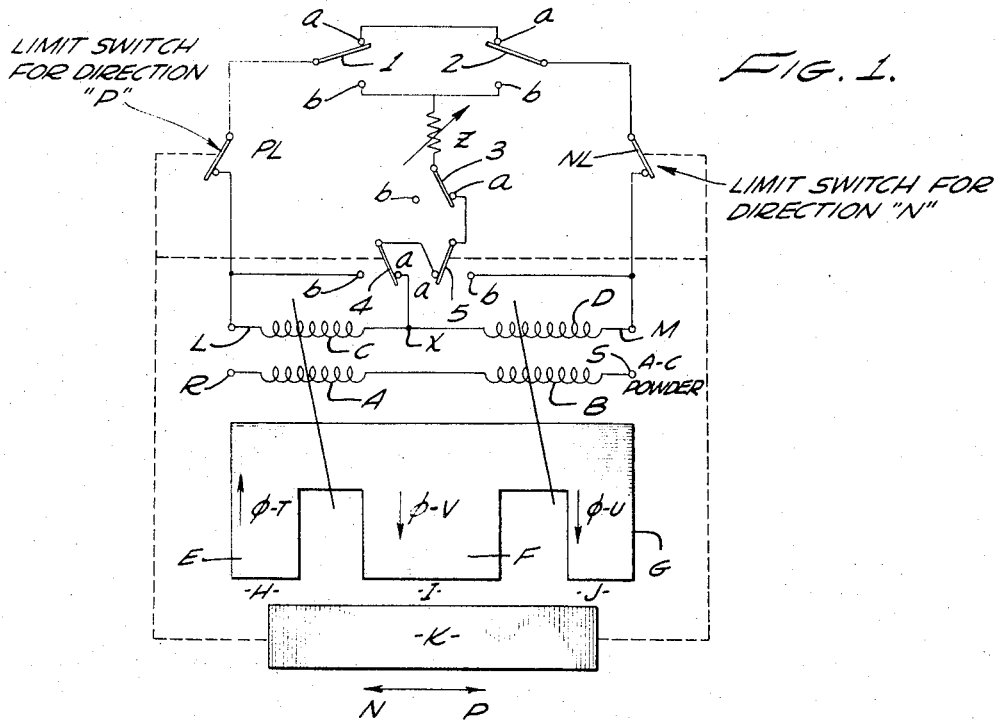
FIGURE 1 is a schematic view showing the circuitry of a preferred form of the invention.

The mechanical force generated by a magnetic flux passing between two ferro-magnetic materials through an air gap is a well known phenomenon. One expression for the magnitude of this mechanical force is the force equation:

$$W = \frac{\phi^2}{72A}$$

Where:

W is the force in pounds
$\phi$ is the magnetic flux in the air gap in kilo-lines (or kilo-maxwells)
A is the area of the air gap, including fringe areas, in square inches.

The force is such at to attempt to bring the two pieces of ferro-magnetic material together. A change in the length of the air gap produces a change in magnitude of mechanical force due to the change in magnetic flux passing through air gap, as shown by the permeance equation below, with a minor effect produced by the reduced fringe area as the air gap is shortened. Since the flux $\phi$ appears as a squared term, the direction of the flux has no effect on the direction of the force. The square of either a positive number or a negative number is always positive.

The magnetic flux in a ferro-magnetic core enclosed by a current carrying conductor or coil is expressed by the induction equation:

$$V = iR + N\frac{d\phi}{dt}$$

Where:

V is the instantaneous voltage impressed on the terminals of the coil
i is the instantaneous current flowing in the coil
R is the resistance of the circuit, including the resistance of the coil
N is the number of turns of the coil that surround the core
$d\phi/dt$ is the rate of change of the magnetic flux with respect to time.

This equation holds true up to the point where the magnitude of the flux is sufficient to "saturate" the core and beyond. As the current increases, the value of flux rate-of-change decreases. If the voltage remains uni-directional, eventually the flux rate-of-change becomes zero due to the increased iR "drop" and to core saturation and the current reaches the value $V/R$. This equation can be treated from either side—that is, consider the flux and current produced by a voltage, or consider the voltage induced by a rate of change of flux produced by some other mechanism. This second consideration accounts for the operation of alternating voltage transformers. With the voltage impressed on a first coil, called the primary, continuously varying from zero to a maximum, to zero, to a negative maximum and returning to zero, the normal design is such that the core never reaches saturation and the largest portion of the impressed alternating voltage is absorbed by the rate of change flux. Very little current flows due to the primary coil alone. With a second coil placed on the core, the flux developed by the primary passes through the secondary coil and develops an alternating voltage due to the rate of change flux. The ratio of primary voltage to secondary voltage is determined by the ratio of the number of turns in the two windings. If an external load is placed on the secondary, current will flow in the external load due to the terminal voltage of the secondary. Since this current flow tends to reduce the flux linkages in the core, the primary coil must supply the required additional energy to maintain the core flux level. Current flow in the secondary coil is determined by the magnitude of the induced voltage and the impedance of the external circuit and the secondary coil. Thus, current flow in the secondary will be transferred back to the primary coil by the inverse ratio of the turns in the two coils.

The flux produced in a magnetic core by a current flow through the enclosing coil is a function of the magnetic permeance of the coil according to the permeance equation:

$$P = \frac{\phi}{F}$$

Where:

P is the permeance of the magnetic circuit, including air gaps and leakage, in appropriate units, one system being maxwells (or lines) per ampere-turn
$\phi$ is a flux produced in the magnetic circuit in maxwells
F is the magnetizing force impressed on the magnetic circuit by the enclosing coil in ampere turns.

Other systems of units may be in gausses of flux and oersteds of magnetizing force.

Since the magnetization curve of a ferro-magnetic material is non-linear, a computed permeance is typical only at a given flux and magnetizing force value. The equation can be used to determine the specified permeance at a given operating flux level and to determine an average value of permeance over the range of flux density in the ferro-magnetic material up to the point of magnetic saturation or the point where the number of flux lines per unit cross sectional area reaches or exceeds the capacity of the ferro-magnetic material to contain the flux. Saturation flux density is not a sharp point but a more or less gradual one and varies in magnitude and sharpness with the type of ferro-magnetic material. Further, the presence of one or more air gaps in the magnetic circuit will affect the amount of magnetizing force required to induce a given amount of total flux. The effectiveness of air in passing magnetic flux is constant and will be from 0.01 to 0.00001 of that of various ferro-magnetic materials. The computation of magnetic flux induction is well documented in the literature of the art and will not be detailed here. It is only to be noted that the permeance noted above is typical for a given magnetic circuit, that the permeance of a magnetic circuit containing air gaps will be much lower than a solid ferro-magnetic circuit and that the flux produced by the magnetizing force according to this equation is the integral of the flux expressed in the rate-of-change term in the magnetic induction equation. A change in the air gap of a magnetic circuit will have a large effect on the permeance, since the magnetic effectiveness of air is from two to six orders of magnitude below that of ferro-magnetic materials.

A ferro-magnetic core material with a single conductive coil wound on it exhibits an impedance to the RMS flow of electric current of alternating potential, over and above the ohmic resistance of the coil. The value of this impedance can be derived from the equation for induction given above. The impedance value is a function of the inductance of the coil and can be expresed in ohms by the reactance equation:

$$X_L = 2(\text{pi})fL$$

Where:

$X_L$ is the impedance in ohms
$f$ is the alternating frequency in cycles per second
L is the inductance in henries.

Further, the inductance can be expressed by the equation:

$$L = N^2 P$$

Where:

L is the inductance in henries
N is the number turns of the coil
P is the permeance of the magnetic circuit in maxwells per ampere turn times $10^{-8}$.

Thus, the impedance is expressed by the equation:

$$X_L = 2(\text{pi})N^2 Pf$$

Since the flow of RMS alternating current is equal to the RMS alternating voltage divided by the impedance, current flow varies inversely as the square of the number of turns in a pure inductive coil.

Impedance in alternating voltage circuits is generally considered to be of two forms, resistive and reactive. Reactance is of two types, inductive and capacitative. Inductive reactance is that impedance associated with an induction coil and the inductance noted above. The combination of ohmic resistance and reactance of either type into a total impedance is an algebraic process of vector summation. The impedance values are considered to have both magnitude and direction. The reactive components are considered to perform at right angle to the resistive component with capacitive and inductive reactance being in opposition. The combination of a resistance and a reactance into an effective impedance utilizes the Pythagorean theorem. The square of the impedance is equal to the sum of the squares of the resistance and the reactance. Thus, if the resistance is small with respect to the reactance, changes in reactance are all most directly reflected in a change in impedance. The converse is also true. A voltage drop across a resistance reflects "real" power dissipated in the form of heat while the voltage drop across a reactance is classed as "imaginary" power and does not produce a change of electrical energy to heat. The effect of resistance magnitude on total impedance is often not mentioned in this discussion on the assumption that the resistance magnitude is not cogent to the particular point under discussion. The function and magnitude of the resistance of the circuit is of significance to the over-all operation of the motor.

The class of machines for converting various forms of energy to mechanical motion, usually called motors or engines, generally operate by generating a non-uniform or reversing movement and mechanically or electrically converting this into a more or less uniform uni-directional motion for performing useful work. This is true of reciprocating internal combustion and steam engines and electric motors of both direct and alternating current types.

This invention utilizes the technology outlined above to produce a motor of simple design and wide application. As previously noted, this motor is capable of rotational or linear motion, depending on the mechanical implementation of the design.

Referring to the schematic diagram of FIGURE 1, a ferro-magnetic core, EFG, shown here as a conventional E-shaped form, is mated with a ferro-magnetic armature K of I-shaped or rectangular form. The core and armature are positioned to form three air gaps, H-I-J, between the three legs of the core and the armature. The I-shaped armature is of such a length as to have the ends of the armature positioned near the center of the ends of the E-core legs E and G—that is, the armature K is shorter in length than the outside dimensions of the E-core legs E and G. Primary coils A and B are wound on the outer legs E and G of the core. Secondary coils D and C are wound on the outer legs of the core so as to have good inductive coupling with the respective primary coils. The primary coils are connected electrically in series with polarity such that the instantaneous magnetic flux induced in the core by each coil is in the same direction—that is, the coils are connected "boosting." The secondary coils are connected electrically in series so that the induced electro-motive force in each coils, caused by an instantaneous magnetic flux rate of change, is in opposition—that is, the coils are connected "bucking." The two remaining leads of the primary coils R and S are brought out for connection to a source of alternating voltage such as a commercial 60-cycle power system.

Figure 5:
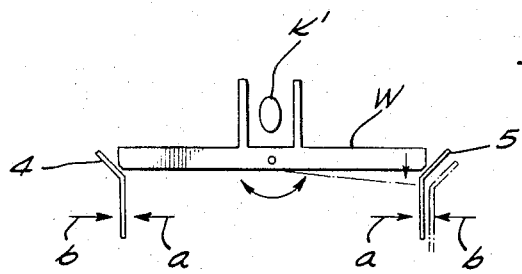
FIGURE 5 is a view illustrating actuation of certain of the switches.

The secondary coils have connections brought out from the two end leads L and M and the center tap X. The switches 1, 2, 3, 4 and 5 are connected to the three leads of the secondary coils as shown. The switches 1, 2 and 3 are preferably mounted in a remotely located control center. The switches 4 and 5 are mounted intimately with the core, the armature and the associated mechanical components. The switches 1 and 2 are spring biased to the *a* position. Switch 3 is a single pole, two position switch, manually operated. Switches 4 and 5 are mounted so as to be actuated by motion of the armature. The switches 4 and 5 have mechanical hysteresis—that is, the switches are not displaced from the *a* position until the armature has made appreciable displacement. The switches remain in the *b* position until the armature has made an appreciable return movement. These switches may be of any of various known types having these characteristics, and are shown diagrammatically in FIGURE 2 associated with the armature. FIGURE 5 shows in more detail a form of actuating mechanism for these switches. Pivoted rocker W has upstanding legs between which is an elliptically shaped member K' actuated by armature K. The ends of rocker W have flats engagable with extensions of switch members 4 and 5 to actuate them. The flats hold in actuated position of the switches until driven back by the rocker. By turning the member K' the stroke length is adjusted.

With all switches in the *a* position and with alternating power applied to the terminals R and S, each primary coil induces an alternating magnetic flux in the respective leg of the E-core. The flux $\phi$–U from coil B is induced in the leg G and across the air gap J into the armature K. Coil A induces a flux $\phi$–T in leg E, air gap H and armature K. The flux produced by coils A and B have the same instantaneous direction, thus the flux $\phi$–T moves in the same direction in the armature as the flux $\phi$–U. Since the coils have the same number of turns, the first tendency is for each coil to produce the same flux, that is $\phi$–T equals $\phi$–U. Since the fluxes are equal in the armature, they aid in the series flow path through K–H–E–G–J. The flux $\phi$–U flowing to the air gap I in the armature is equal to the flux $\phi$–T flowing away from the air gap I in the armature and no flux will flow across the air gap I into the leg J of the E-core. This produces two air gaps, one at each end of armature K, with equal flux flowing. In the air gaps are equal in area, the force generated in each gap will be equal and the armature will remain stationary. If the air gaps are not equal in area, the smaller air gap will develop the larger force according to the magnetic force equation noted above. This larger force in the smaller air gap is such as to move the armature K in a direction to equalize the size of the two air gaps. If the armature is suspended to move freely, as from a pivot point, it can move to the position of equal air gap areas. Such a pivot point is indicated at 2–W in FIGURE 2.

With the secondary coils C and D connected in opposition through switches 1 and 2 in positions *a*, and with the coils wound in intimate magnetic coupling with the primary coils A and B, each secondary coil will have an alternating voltage induced in it by the rate of change of the alternating magnetic flux through the coil in accordance with the induction equation.

Since it is possible to have a difference in the flux flow in the E-core legs F and G, and such a difference will be induced in the operation, the induction equation above shows that different voltage levels will be induced in the secondary coils C and D, each in accordance with the rate of change of flux through the respective coil. Since the coils C and D are connected in opposition through switches 1 and 2 in the *a* position and the connection X, the coil having the higher induced voltage will overcome the voltage in the other coil and cause a current flow through this second coil in opposition to the induced voltage in that lower voltage coil. This current flow is in such a direction as to aid the primary coil in the build up of magnetic flux. Further, the current flow in the secondary coil having the higher induced voltage will add to the current term of the induction equation for the primary coil of that leg by the ratio of primary to secondary coil turns. This reduces the magnetomotive force available to the core leg with the higher flux and induced voltage, slowing the rate of change of flux and reducing the induced voltage. The combination of these two effects is to equalize the flux flow in the two air gaps H and J by an automatic shift of magentizing force to the core section with the lower permeance, through the medium of the secondary coils coupled in opposition. With equal flux flowing in the air gaps J and H, the air gap area equalization procedure described above will take place. This establishes the "neutral" or non-operated position of the motor.

To initiate operation of the motor, assume first desired movement to be in direction P toward air gap J, switch 1 is moved from position 1*a* to position 1*b*. This completes a closed circuit or short circuit across secondary coil C through switches 3 and 4 and the associated wires. From the induction equation above, it is to be noted that the "*i*R" term, referred to primary coil A, consists of the primary current times the primary resistance. The secondary current is referred to the primary by the ratio of the turns of the two coils and becomes a factor in the magnitude of the primary current.

Since the resistance of the secondary coil external circuit is very low, and since for the secondary coil the external voltage is zero, the flux rate of change is limited by the secondary *i*R term. With a small R, *i* becomes large and the "loading" of the low impedance secondary coil circuit on the magnetic core will severely restrict the build-up of magnetic flux in the core. Current will pass through the primary coil and induce a corresponding current in the secondary coil with a very limited flux build-up in the core. This same current will flow in the primary coil B on the magnetic core leg G. Since the secondary coil D is now open circuited at switch contact 1*a*, no current can flow in the secondary coil D. The current flow in primary coil B goes to primary *i*R drop and the production of magnetic flux according to the induction equation and the permeance of the core section G–J–K. Since the external voltage available to primary coil B is now nearly equal to the external applied voltage, the flux build-up on the section G–J will be greater than in the neutral condition. Since primary coil A and the secondary coil C inhibit the flow of magnetic flux in section E, flux flow in the air gap H will also be inhibited. Thus, the flux $\theta$–U will meet with magnetic opposition at the center point of the armature K and will complete the flow path through air gap I and core leg F, that is $\theta$–V. The width of the E-core leg F is roughly twice the width of legs E and G. This is not necessary to operation of this motor, but is typical of commercially available transformer laminations. It is fortuitous for this operation. From the magnetic force equation, the force developed in an air gap is inversely proportional to the area of the air gap. Since the width of leg F is twice that of leg G and further, since the armature K is interposed on only half of the leg end area of leg G, the air gap J is much smaller than air gap I and will produce a much larger force. This force is available to translate the armature K in the direction P. Such translation will take place in an effort to equalize the effective areas in the air gaps I and J. The translation of armature K and the force producing this translation are available to perform work on some external mechanical system. This completes the first portion of the flux-motion cycle.

Switches 4 and 5 are mechanically positioned to be actuated by movement of the armature. Switch 5 is actuated by motion in the direction P, and switch 4 is actuated by motion in direction N. Consider switch 5 and motion direction P. The mechanical connection between the armature K and the switch 5 is provided with a required amount of mechanical hysteresis, that is, armature K will move a stated distance before switch 5 is actuated to *b* position, and then switch 5 will remain in *b* position during some stated travel distance of the armature in the return direction before switch 5 is returned to the *a* position. With switch 5 in the *a* position, the actuation of switch 1 from *a* to *b* provides the aforementioned closed circuit on secondary coil C and the open circuit on secondary coil D. This provides the conditions necessary to develop an actuating force in direction P. After movement of the armature K in direction P for a stated distance, switch 5 is actuated from position *a* to position *b*. The external wiring and internal circuitry are such that switch 5 in position *b* removes the closed circuit on secondary coil C and completes the connection of secondary coils C and D in voltage opposition. This restores the circuit requirements for producing equal flux in core legs E and G as noted above and minimizes the flux flow in core leg F. This condition of equal flux is presented to air gaps H and G at a time when gap H is smaller than gap G due to the displacement of the armature K. By the reasoning outlined above, the smaller air gap will develop the larger force. This force difference will restore the armature K to the normal or unactuated position. The return of the armature to the normal position will restore switch 5 to the *a* position after a stated travel distance. If switch 1 is held in the *b* position, the motion cycle will repeat continuously until some external electrical or mechanical limit is interposed. If, at the initial time, switch 2 is actuated to *b* position, the first motion will be in direction N, since secondary coil D is short-circuited and flux is limited in core leg G and air gap J. Switch 4 will be actuated after a stated travel distance to produce a restoring force on the armature K. In other words, switches 1 and 2 control the direction of operation, as will appear more clearly hereinafter.

Since the design of this mechanism and the discussion given above propose that coils A and B will be connected to the source of electric power continuously during the interval when operation may be desired, the non-actuated or "idling" power consumption is of interest. With all switches in the *a* position, the connection of the secondary coils is such as to cancel out any electrical or magnetic effect they may have, if the magnetic circuit is balanced by proper placement of the armature K. Consider then, only the two primary coils and the associated magnetic circuit consisting of the core legs E and G, the air gaps H and J and the armature K. This system constitutes an induction coil having an impedance to the flow of alternating current as expressed by the inductance equation above. The impedance of the coil is a function of the square of the number of turns in the coil. Thus, the primary coils in series will have four times the impedance to current flow of either coil individually. For purposes of example, the quadrature effect of summing inductive reactance and ohmic resistance will be neglected, though this is not unimportant in the operation of the circuit. Neglecting resistance components, the "idling" current of the actuator system will be one-fourth of the "actuated" current. Thus, there is a low level of idling power consumption. During the first movement of the armature due to placing switch 1 in the *b* position, the short circuit on the secondary coil C inhibits the build up of flux in the core section E. This reduces the inductive reactance of coil A to a very low value. Neglecting resistance of the coil windings, the total external voltage is placed across coil B. Referring to the induction equation, this shows that the rate of change of flux in the core leg G and the air gap J will be very roughly twice that of the non-actuated position. This indicates that at any given time, the flux level will be roughly twice that of the non-switched condition. From the force equation, it is seen that the force produced is a function of the square of the flux. This factor, combined with the increased flux in the switched condition, indicates a tendency toward four times the force in the switched or "first motion" condition. Not all of this increase in force will be realized due to resistance effects, non-linearity in the magnetic circuit and other factors, but a significant increase in force will ensue. Since it is assumed that external work is desired during the "first motion" part of the cycle, and only an armature restoring force is required during the "second motion" part of the cycle, the reduced force due to increased inductance and reduced current with switches 5 and 1 in *b* position is advantageous.

In some applications of this motor, it will be desirable to place the switches 1, 2 and 3 in a portable, hand-held switch housing to enable movement of the control center. With such an arrangement, the potential in the switch with respect to ground is of interest because of personnel safety considerations. Since the potentials at the switch are the sum of the potentials in the secondary coils and any serially summed, connected primary coil potentials, the coil potentials are of importance. Since the potential of the primary coils is set by the magnitude of the connected power source, and since the induced voltage in the secondary coil is proportional to that of the primary induced EMF by the ratio of secondary turns to primary turns, it is to be noted that the external voltage of the secondary coil can be made as low as is desired by suitable primary to secondary turns ratio. There is not unlimited freedom here, since, as the secondary voltage is decreased by turns reduction, the secondary current will increase during "first motion" conditions by the inverse ratio. Thus a balance must be designed between reduced secondary voltage and increased secondary current. Since potential or voltage is the significant safety item, reduced voltage can be favored. The coupling between the secondary and primary coils on the legs of the E-core is by induction and not be conduction. Thus, the basic potential level of the secondary coils with respect to ground is not affected by the potential of the primary coils, a principle used in "isolation" transformers. This contributes further to the establishment of safe potential levels in the operating switches of the motor. The combination of low potential and isolation in the switches 1, 2 and 3, provide a control that is safe for hand held operation.

Figure 2:
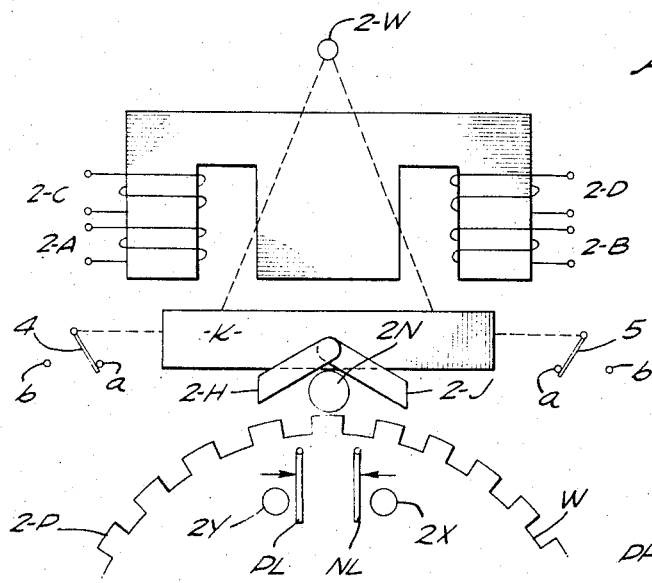
FIGURE 2 is a schematic view illustrating the mechanical arrangement of a preferred form of the invention.

The mechanization of the transfer of armature movement to an external load can take many forms and can be adapted to either linear or rotational motion. One preferred embodiment is shown in FIGURE 2. Two oppositely oriented ratchet pawls, 2J and 2H, are attached to the armature K. A pawl lifting pin 2N is positioned so that with armature K in the neutral position, both pawls are lifted. A toothed wheel or gear or linear rack W is positioned near the two pawls. When the armature K starts motion under influence of the changed magnetic fields, the first movement is such as to lower one of the pawls and raise the other pawl by movement across the pin 2N. The lowered pawl contacts the tooth 2P of wheel W. With continued movement of the armature K, the mechanical motion of the armature is transferred to the wheel W through contact of the lowered pawl with one of the gear teeth, thus moving the gear. The return motion of the armature does not perform any useful work. At the neutral position of the armature, the lowered pawl contacts the next tooth on the gear. During the second motion of the armature, the gear is advanced still further, thus producing external work. Limit switches NL and PL are placed in the electrical circuit such as to be operated by the limit switch stops, 2X and 2Y, to stop movement at some desired position.

One feature of this embodiment is the "free wheeling" condition of the gear during non-actuated positions of the armature. With both pawls raised by the pin 2N, there is no restraint on the gear and manual adjustment is possible. This feature can be eliminated by mechanization of a second pair of ratchet pawls. The gear is thus caused to remain in a fixed position until operated by the motor. A linear rack can be substituted for the round gear to produce linear motion.

Further, this motor can easily be adapted to full power reciprocating operation for operation of devices such as double acting piston pumps. Proper positioning of the switch actuators for switches 4 and 5 will cause the motor to switch from maximum power in one direction to maximum power in the opposite direction. Auxiliary switches will be required to permit the neutral position of the armature for this configuration.

The motor is inherently a single speed device. Speed variation can be accomplished by several means. The inherent speed of the motor can be adjusted by the design of the magnetic system and by variation of the mass of the armature. This speed of operation will be typical of a specific embodiment of the motor. Variation of the specific motor over limited speed range can be accomplished by a mechanical brake on the armature to slow the armature motion. Another method is the placement of a variable impedance, resistance or reactance, designated Z, in the center tap lead wire to the center tap connection X. This impedance affects the current flowing in the short-circuited secondary and thus affects the induction equation. The effect of increased impedance is to reduce the $iR$ term of the equation and reduce the amount of flux un-balance between the two outside legs. This reduces the force on the armature and thus reduces the speed of operation. By this method, speed variation over limited ranges can be accomplished from the remote control station.

A large change in speed of operation can be accomplished by coupling two motors together through a suitable speed changing transmission. By this means, one motor is the high speed range, the other is low speed range. This requires the addition of further switches to the control center and an additional lead for the center tap to the second motor.

For a very small change increment, switch 3 in the contol center can be made to bypass or shunt the automatic return switches 4 and 5. With switch 3 in the $b$ position, actuation of switch 1 from $a$ to $b$ will produce a single actuation of the armature in one direction only. The armature will return to neutral only upon restoring switch 1 to the $a$ position. This enables small single steps of the gear to be accomplished.

For some forms of mechanical work an oscillating drive is desirable. This is typical of compressors or piston pumps. This invention is adapted to such continuous operation by a change of the switch operating points. The control center or station can be eliminated and switches 4 and 5 mechanically coupled to operate to opposite status at the same time, i.e., 4a–5b or 4b to 5a only. The mechanical operating points are placed near the travel limits of the armature K. Thus, when the primary coils are connected to an external power source, the armature is immediately caused to move in one direction or the other, depending on the switch setting. If the switches are in the 4a–5b position, motion will be in direction P. At the end of travel in direction P, the switches are shifted to the 4b–5a state. This causes full force to be applied in direction N and the force will exist until the limit of travel is reached. Operation of the switches to the 4a–5b position will produce travel in the P direction with full force available from the position of switch actuation until the end of travel.

Figure 3:
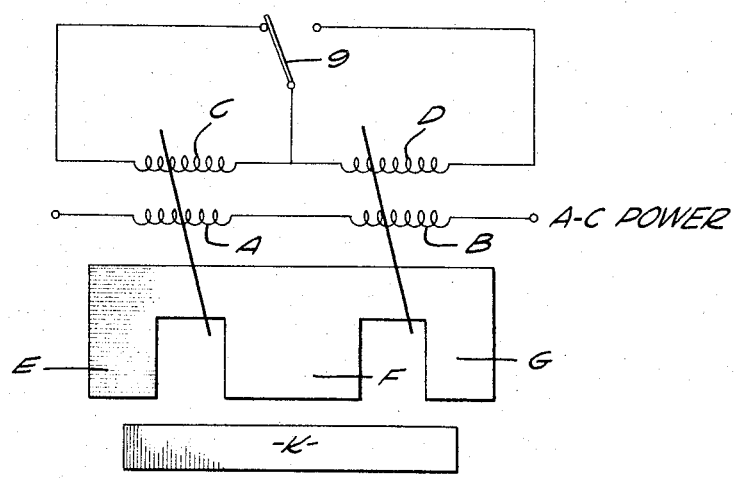
FIGURE 3 is a schematic view illustrating a modified form of the invention.

Switches 4 and 5 can be replaced by a single pole, double throw switch 9, as shown in FIGURE 3, for providing oscillating drive under manual control.

Figure 4:
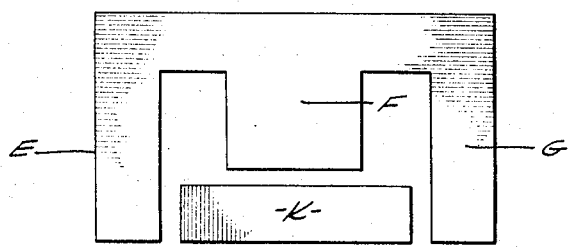
FIGURE 4 is a view of a slightly modified form of core and armature construction.

The physical embodiment of the core and coil structure can take a variety of forms by using special core forms. FIGURE 4 shows one such core form. The previous embodiment makes use of the existing standard E laminations available in a wide range of sizes and materials from commercial sources. The core of FIGURE 4 has longer E and G legs and a shorter F leg with the armature K between the ends of the E and G legs. This configuration has certain advantages from the standpoint of effective use of the available flux.

The switches may take many forms other than the mechanically actuated switches described. For some applications involving high switching currents and consequent switch contact deterioration, the class of semiconductor devices known as controlled rectifiers may be used. This circuit may be particularly adapted for a continuously operating motor without a remote control center or station.

From the foregoing, those skilled in the art will readily observe that the invention achieves and realizes all of the objects and advantages stated in the foregoing as well as having many additional advantages which are apparent from the detailed description. The foregoing disclosure is representative of preferred forms of the invention and is to be interpreted in an illustrative rather than a limiting sense. The invention is to be accorded the full scope of the claims appended hereto.

What is claimed is:

1. An electromagnetic actuator comprising an electromagnet having a core having windings thereon and a movable armature associated therewith adapted to act as a driving member, said windings including first and second primary windings connected in boosting relationship, first and second secondary windings and circuit means for connecting the secondary windings in opposition, switch means for short circuiting one of said secondary windings and open circuiting the other of said secondary windings whereby an electromagnetic force is produced causing said armature to move, and switch means operable by movement of the armature for reinstating the initial condition in which the first and second secondary windings are connected in opposition.

2. A device as in claim 1, wherein said switch means includes contacts whereby either the first or the second of said secondary windings can be short circuited with the other of said secondary windings open circuited whereby to produce initial movement of the armature in either direction, the said switch means including contacts operable by movement of the armature for reinstating the original circuit connections of the secondary windings to provide for repeated cyclic movement of the armature, irrespective of the initial direction of movement from a neutral position.

3. A device as in claim 1, including a driven member and pawl and ratchet means whereby the armature may drive the member in one direction.

4. A device as in claim 3, wherein said driven member has ratchet teeth thereon, said pawl means comprising a pair of pivoted pawl members carried by the armature, means positioned to normally hold said pawl members out of engagement with the ratchet teeth when the armature is in an intermediate position, said last means having a position with respect to the pawl members whereby upon movement of the armature in one direction one pawl engages the ratchet teeth to drive the driven member and the other pawl member is held disengaged and when the armature moves in the other direction, the other pawl is caused to engage the ratchet teeth and the first pawl is held out of operative engagement.

5. A pawl and ratchet drive mechanism comprising a driven element having ratchet teeth, a movable driving member adjacent to the ratchet teeth, a pair of pawl members carried by the driving member and co-operable with the ratchet teeth, a member having a position adjacent the said pawl members whereby to hold them out of operative engagement with the ratchet teeth when the driving member is in an intermediate position, said member having relationship to the pawl members whereby upon movement of the driving member in one direction, one pawl member engages with the ratchet teeth and the other pawl member is held out of operative engagement with the ratchet teeth and when the driving element moves in the other direction the other pawl member is brought into operative engagement with the ratchet teeth and the first pawl member is held out of operative engagement.

6. An electromagnetic device comprising an electromagnetic core configurated to provide a plurality of poles, a movable armature associated with said poles, primary windings on said core positioned to produce magnetic flux between said poles and said armature, secondary windings on asid core, and means for shorting at least part of said secondary windings to produce a variation in magnetic force acting on said armature whereby to cause said armature to move.

7. A device as in claim 6, including means for shorting either of the secondary windings while open circuiting the other.

8. An electromagnetic device comprising an electromagnet including a core configured to provide a plurality of poles, a movable armature associated with said core, primary windings on said core, including first and second primary windings connected in boosting relationship for producing magnetic flux between said poles and said armature, secondary windings on said core, including first and second secondary windings, switch means normally connecting said secondary winding in opposing relationship, said switch means having positions for normally short circuiting one of said secondary windings and open circuiting the other of said secondary windings whereby to produce magnetic forces on said armature causing it to move, and means for actuating said switch means in response to movement of said armature whereby to return the circuits to their initial state.

9. A device as in claim 8, including switch contacts operable by movement of the armature to interrupt the short circuit of said one secondary winding and to reconnect the secondary windings in opposition, said switch contacts being operable by reverse movement of the armature towards a neutral position to again interrupt the circuit connecting the said secondary windings in opposition and to again short circuit said one secondary winding to cause repetitive cyclical operation of the said armature.

10. A device as in claim 9, including switch means movable to positions whereby to cause said armature to operate in cyclical movements in either one direction or the other from a neutral position.

11. A device as in claim 10, including circuit and switch means whereby to cause said armature to operate in oscillating movements between positions displaced on opposite sides of a neutral position.

12. A device as in claim 1, whereby said core is configurated to have three leg portions providing poles with said armature disposed adjacent said poles.

13. A device as in claim 12, wherein the said leg portions include two relatively longer end leg portions and a relatively shorter intermediate leg portion with the said armature.

14. An electromagnetic actuator comprising a core and a movable armature associated therewith, said core having primary windings and secondary windings associated therewith and having a pole structure such that the movable armature has three positions including an intermediate neutral position, means for controlling the energization of the said secondary winding whereby to cause the armature to move in one direction or the other, said control means having means for controlling the secondary windings where to produce flux such that the armature assumes an intermediate neutral position.

15. A device as in claim 14, wherein the core is shaped to provide three discrete poles with air gaps between the poles and the armature, and means whereby said secondary windings are energizable in such a way as to produce magnetic fluxes in the air gaps whereby equal forces are exerted upon the armature causing it to assume a discrete intermediate neutral position.

References Cited

UNITED STATES PATENTS 1,098,893    2/1941    Dinsmoor _____ 310—35

FOREIGN PATENTS 344,001    3/1931    Great Britain.

OTHER REFERENCES

Standard Handbook for Electrical Engineers, Ninth Edition, section 2–47, p. 44, McGraw-Hill, New York, 1957.

Terman, F. E.: Fundamentals of Radio, pp. 40–41, McGraw-Hill, New York, 1938.

MILTON O. HIRSHFIELD, *Primary Examiner.*

C. W. DAWSON, *Assistant Examiner.*